(12) United States Patent
Takamura et al.

(10) Patent No.: US 7,768,236 B2
(45) Date of Patent: Aug. 3, 2010

(54) ELECTRICAL DEVICE AND BATTERY PACK FOR PREVENTING POLARITY REVERSAL OF BATTERY

(75) Inventors: Koshi Takamura, Osaka (JP); Toshihiko Ichinose, Nara (JP); Harunari Shimamura, Osaka (JP)

(73) Assignee: Panasonic Corporation, Osaka (JP)

( * ) Notice: Subject to any disclaimer, the term of this patent is extended or adjusted under 35 U.S.C. 154(b) by 445 days.

(21) Appl. No.: 11/878,946

(22) Filed: Jul. 27, 2007

(65) Prior Publication Data

US 2008/0024948 A1    Jan. 31, 2008

(30) Foreign Application Priority Data

Jul. 28, 2006    (JP)    ............... 2006-206826

(51) Int. Cl.
    *H01M 10/46* (2006.01)
(52) U.S. Cl. .................... 320/134; 320/136
(58) Field of Classification Search ........... 320/103, 320/107, 112, 116, 134, 136
See application file for complete search history.

(56) References Cited

U.S. PATENT DOCUMENTS 6,333,123 B1    12/2001    Davis et al.
6,617,069 B1    9/2003    Hopper et al.
2003/0141847 A1*    7/2003    Fujiwara ............... 320/134
2005/0258805 A1*    11/2005    Thomas et al. ......... 320/134

FOREIGN PATENT DOCUMENTS

JP    7-272770    10/1995
JP    2002-525806    8/2002
JP    2004-502280    1/2004

\* cited by examiner

*Primary Examiner*—Edward Tso
(74) *Attorney, Agent, or Firm*—McDermott Will & Emery LLP (57) ABSTRACT

An electrical device comprises a positive electrode terminal for connection to the positive electrode of a battery, a negative electrode terminal for connection to the negative electrode of the battery, a load circuit receiving power from the positive and negative electrode terminals connected to the battery, a voltage detector detecting the voltage between the positive and negative electrode terminals, and a short circuiting portion for short-circuiting between the positive and negative electrode terminals when the voltage detected by the voltage detector becomes not larger than a particular preset voltage.

13 Claims, 7 Drawing Sheets

ELECTRICAL DEVICE AND BATTERY PACK FOR PREVENTING POLARITY REVERSAL OF BATTERY

BACKGROUND OF THE INVENTION

1. Field of the Invention

The present invention relates to an electrical device using a battery and also to a battery pack.

2. Description of the Prior Art

Batteries have been used widely as a power source for electrical devices.

Examples of the electrical devices using such a battery as power source include those in the structure having a compartment removably storing a primary battery, those having a chargeable secondary battery in the main body, and the like.

In the tread toward improvement in performance, power consumption of portable electrical devices such as cellphone and digital camera is also increasing gradually. Accordingly, the main power source for such a high-performance portable electrical device is preferably larger in capacity and higher in energy density. The main power sources for portable electrical devices are mainly secondary batteries, but such a secondary battery should be charged with a battery charger or with a power supply device called AC adapter that converts commercial AC power supply voltage into DC charging voltage, as it is connected to commercial AC power source, and thus, use of it outdoor, where the secondary battery cannot be charged, is inconvenient. Recently, a system of charging a secondary battery by using an auxiliary power source that can be removably installed in such a portable electrical device was reported. A primary battery is used as the auxiliary power source.

However, the primary or secondary battery used as main power source and the primary battery used as auxiliary power source in the electrical device described above may be discharged by leak current into an excessive discharge state if they are left connected to the circuit of the electrical device. These batteries have a problem that they may be degraded, causing leakage and drastic temperature rise of the cell in the excessive discharge state.

Figure 6A:
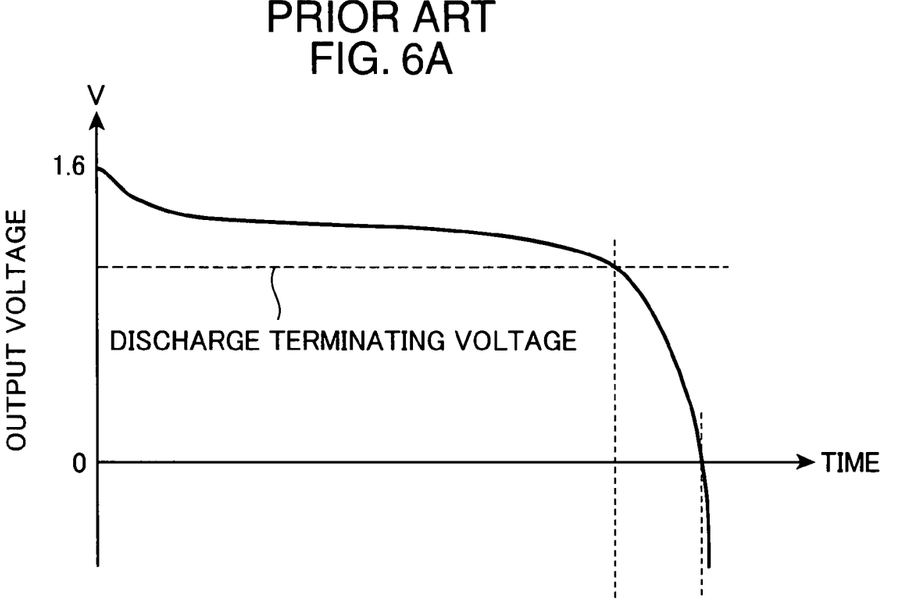
Figure 6B:
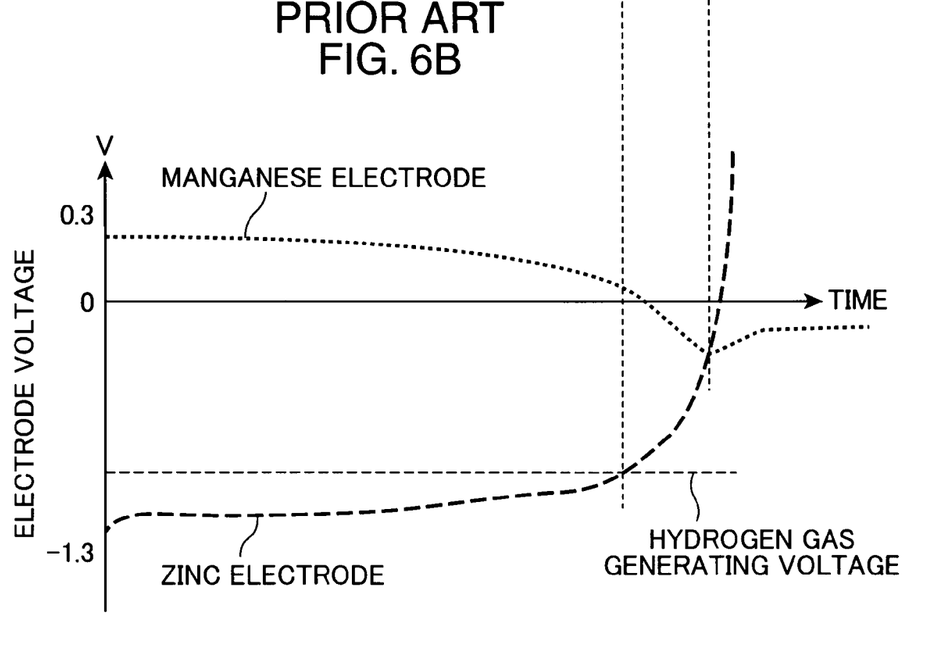
FIG. 6B shows change in the electric potential of the positive and negative electrodes of the alkaline battery.

FIGS. 6A and 6B are graphs showing the change of the output voltage and the electric potential of the electrode (electric potential vs. HgO/Hg) when an alkaline battery, an example of the primary battery, is discharged continuously at a constant current. FIG. 6A shows the change of the alkaline-battery output voltage, while FIG. 6B shows the change of the electric potential of the positive and negative electrodes of the alkaline battery.

In the case of an alkaline battery, a manganese electrode is used as the positive electrode, and a zinc electrode as the negative electrode. The difference between the electric potential of the manganese electrode and that of the zinc electrode shown in FIG. 6B corresponds to the alkaline battery output voltage shown in FIG. 6A. Along with progress of discharge of the alkaline battery, the electric potential of the manganese electrode declines gradually and the electric potential of the zinc electrode rises gradually, leading to decrease in output voltage, and, when the output voltage reaches a discharge terminating voltage, the lowest voltage allowing reliable discharge, the electric potential of the zinc electrode rises beyond the hydrogen gas generating electric potential, resulting in generation of hydrogen gas from the zinc electrode.

When the alkaline battery is discharged continuously further, the electric potential of the manganese electrode declines gradually, while the voltage of the zinc electrode rises rapidly, while hydrogen gas is generated continuously form the zinc electrode. The electric potential of the manganese electrode is stabilized in a particular range of −0.4 to −0.3 V, but the electric potential of the zinc electrode rises further until the electric potential of the zinc electrode becomes higher that that of the manganese electrode; i.e., the system becomes in a so-called polarity reversal state in which the manganese electrode becomes a negative electrode, while the zinc electrode a positive electrode; and thus, the alkaline battery then has a negative output voltage. Because the electric potential of the manganese electrode (negative electrode) is then higher than the hydrogen gas generating electric potential, hydrogen gas is generated from the manganese electrode.

When an alkaline battery is discharged continuously by leakage current of circuit as described above, hydrogen gas may be generated in the battery, leading to increase in pressure of the battery and thus easier leakage of the electrolyte solution.

Figure 7:
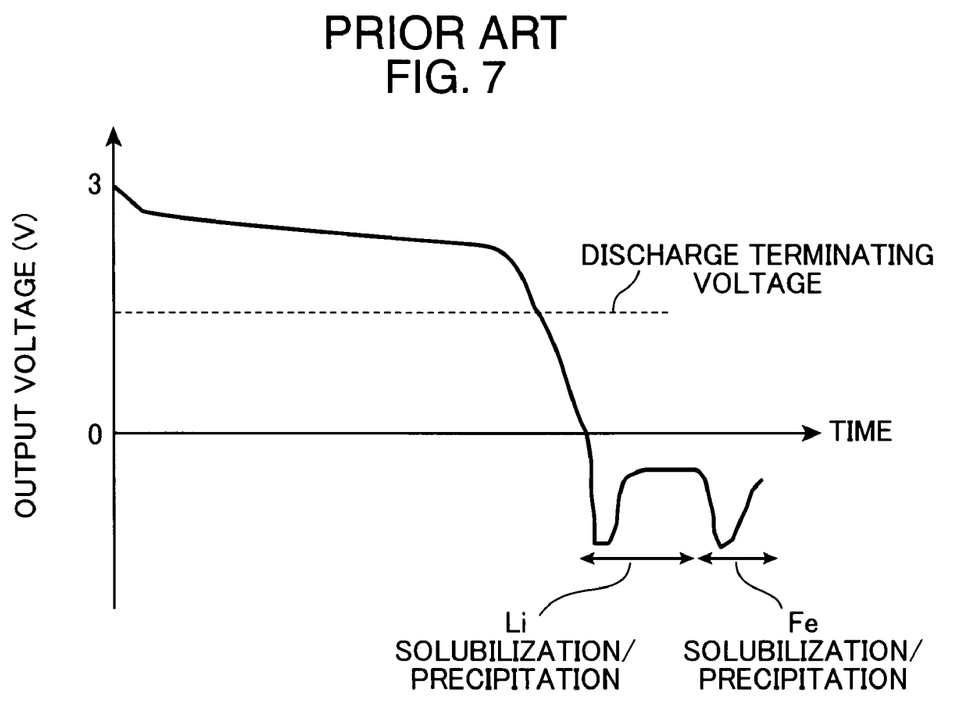
FIG. 7 is a graph showing change in the output voltage when the alkaline battery described in the description of the background is discharged by a leakage current of the circuit.

FIG. 7 is a graph showing the change of the output voltage of a lithium battery, an example of primary battery, when discharged continuously at a constant current. In the case of a lithium battery, a manganese electrode is used as the positive electrode, while a lithium electrode as the negative electrode. Along with progress of discharge of the lithium battery, the output voltage declines gradually. During the period of the battery output voltage declining to 0 V, the lithium electrode may be dissolved, but no lithium dendrite deposits on the manganese electrode.

When the battery output voltage becomes lower than 0 V and the polarity reversal occurs, lithium dendrite deposits on the manganese electrode, and lithium is dissolved and deposited both on the lithium and manganese electrodes. The lithium solubilization/precipitation reaction reaches equilibrium between the lithium and manganese electrodes, and the battery voltage becomes constant temporarily. In such a case, after the polarity reversal, the precipitated lithium dendrite penetrates through the separator, causing short circuiting of the lithium electrode with the manganese electrode, and the short-circuit current may raise the temperature of the lithium battery rapidly.

Even when the lithium battery is not short-circuited during the battery voltage is constant in the lithium battery in the polarity reversal state, if the lithium battery is discharged continuously, iron (Fe) may be dissolved, for example from the case of the lithium battery or the current collector, causing deposition of iron. The deposited iron then penetrates through the separator, causing short-circuiting of the lithium electrode with the manganese electrode, and the short-circuit current may raise the temperature of the lithium battery rapidly.

As described above, a battery in the excessive discharge state may cause troubles such as leakage of its solution and rapid temperature rise, and thus, various methods were proposed to solve the problems. For example, methods of preventing excessive discharge of battery by installing an excessive discharge prohibiting circuit in battery are reported (see for example, Japanese Patent Unexamined Publication No. 2002-525806(kohyo)). Alternatively, methods of absorbing the hydrogen gas generated in battery are proposed for preventing the leakage by excessive discharge of the alkaline battery, and specific examples thereof include methods of using a hydrogen-adsorbing substance placed on the internal face of the alkaline battery casing (see, for example, Japanese Patent Unexamined Publication No. 07-272770) and methods of using a hydrogen adsorption catalyst placed, for example, in the alkaline battery (see, for example, Japanese Patent Unexamined Publication No. 2004-502280(kohyo)).

However, as described in Japanese Unexamined Patent Publication No. 2002-525806(kohyo), the battery containing an excessive discharge prohibiting circuit by the method of preventing excessive discharge by using an excessive discharge prohibiting circuit is indeed a high-resistance resistor, but there remained a possibility of a trace amount of current flowing in the battery. Accordingly when multiple batteries connected to each other in series are used, if any one of the batteries in series is left in the state where the excessive discharge prohibiting circuit is in operation, the battery may be discharged continuously, as driven by the other batteries still retaining some capacitance.

Similarly to the methods described in Japanese Patent Unexamined Publication Nos. 07-272770 and 2004-502280 (kohyo), the method of using an absorbent absorbing the hydrogen gas generated in the alkaline battery had a problem that pressure rise and leakage of the battery occur by the unabsorbed hydrogen gas because, if hydrogen gas is generated in an amount more than the hydrogen-absorbing capacity of the hydrogen-adsorbing substance, it is not possible to absorb the hydrogen gas completely.

SUMMARY OF THE INVENTION

An object of the present invention is to provide an electrical device and a battery pack that are resistant to rapid temperature rise and leakage of the battery.

According to an aspect of the present invention, an electrical device includes a positive electrode terminal for connection to a positive electrode of a battery, a negative electrode terminal for connection to a negative electrode of the battery, a load circuit for receiving power from the positive and negative electrode terminals connected to the battery, a voltage detector for detecting a voltage between the positive and negative electrode terminals, and a short circuiting portion for making a short circuit between the positive and negative electrode terminals when the voltage detected by the voltage detector becomes not larger than a particular preset voltage.

According to another aspect of the present invention, a battery pack includes a battery, a voltage detector for detecting an output voltage of the battery, a short circuiting portion for short-circuiting the battery when the voltage detected by the voltage detector is not larger than a particular preset voltage, and an externally outputting terminal for outputting the output power of the battery.

The battery in the electrical device and the battery pack in such a configuration is short-circuited by the short circuiting portion when the battery output voltage is lower than a particular preset voltage, and the positive and negative electrodes of the battery are charged to the same electric potential, preventing polarity reversal, and thus, there is less concern about the drastic temperature rise and leakage of the battery.

These and other objects, features, aspects and advantages of the present invention will become more apparent upon a reading of the following detailed description and accompanying drawings.

BRIEF DESCRIPTION OF THE DRAWINGS

FIGS. 4A and 4B are graphs showing change in the output voltage and the electric potential of the primary-battery electrode (vs. HgO/Hg) when an alkaline battery is used as the primary battery shown in FIG. 1, wherein FIG. 4A is a graph showing change in the output voltage.

FIGS. 6A and 6B are graphs showing change in the output voltage and the electric potential of the electrode (vs. HgO/Hg) when the alkaline battery described in the description of the background is discharged by a leakage current of the circuit, wherein FIG. 6A shows change in the alkaline-battery output voltage.

DETAILED DESCRIPTION OF THE PREFERRED EMBODIMENT OF THE INVENTION

Figure 1:
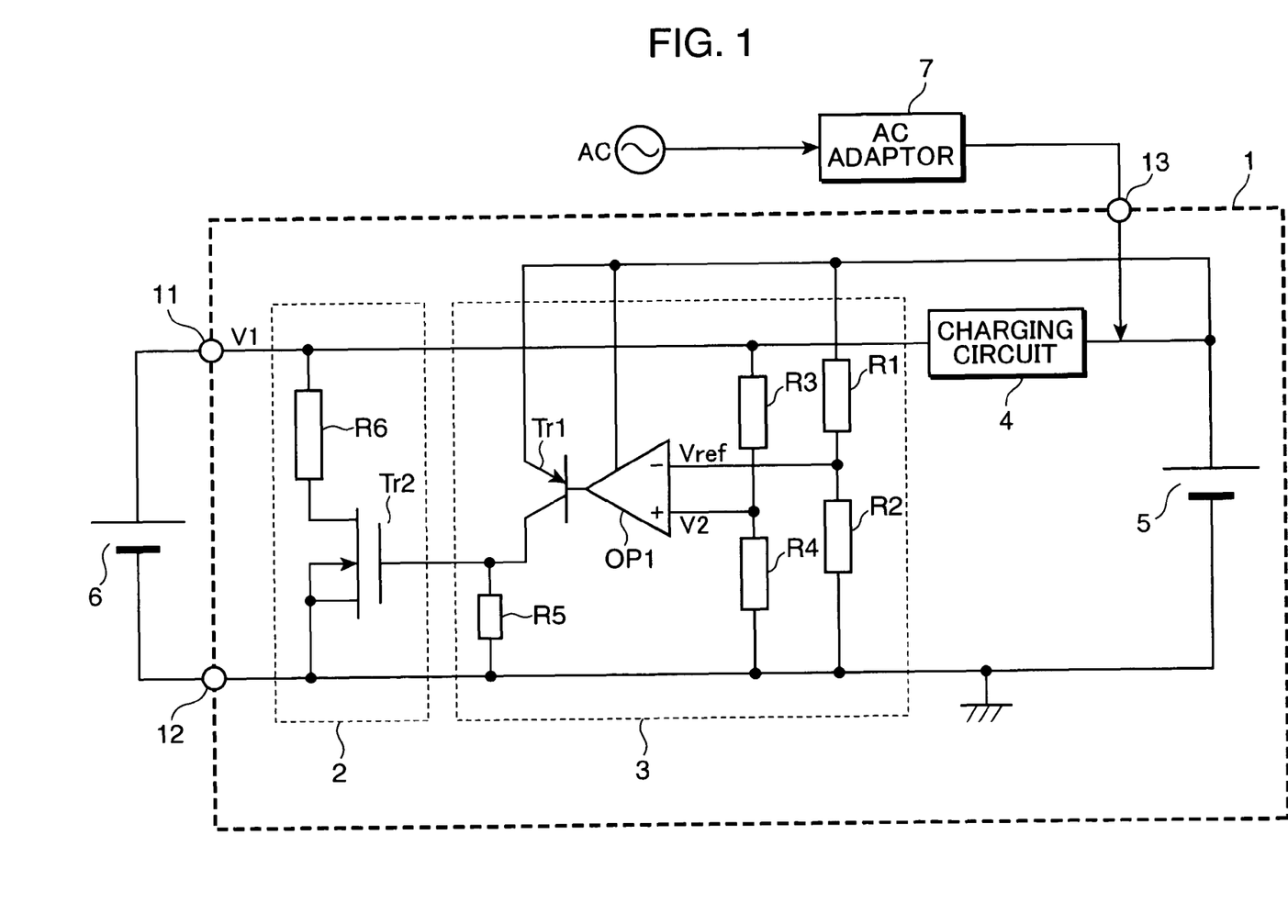
FIG. 1 is a block diagram showing a configuration of an electrical device in an embodiment of the present invention.

Hereinafter, favorable embodiments of the present invention will be described with reference to drawings. The codes common in respective Figures indicate the same components, and duplicated description is omitted. FIG. 1 is a block diagram showing an example of the configuration of the electrical device in an embodiment of the present invention. The electrical device 1 shown in FIG. 1 is a portable electrical device such as cellphone or digital camera, using a secondary battery as its power source. The electrical device 1 shown in FIG. 1 has, for example, a positive electrode terminal 11, a negative electrode terminal 12, an external-power-source lead terminal 13, a short circuiting portion 2, a voltage detector 3, a charging circuit 4 (charger), and a secondary battery 5. The electrical device 1 is configured to charge the main power source, secondary battery 5, with output power from an auxiliary power source, primary battery 6 (battery), connected externally to the positive electrode terminal 11 and the negative electrode terminal 12.

The secondary battery 5 is a secondary battery allowing repeated charge/discharge cycle such as lithium ion battery, nickel metal-hydride battery, nickel cadmium battery, nickel zinc battery, or silver oxide battery. In this case, the secondary battery 5 corresponds to an example of energy storage element. The energy storage element is not limited to a secondary battery, and may be other energy storage element such as electrical double-layer capacitor. The secondary battery 5 is used as the main power source for electrical device 1, and supplies power to a load circuit not shown in the Figure for operation of the electrical device 1 such as cellphone or digital camera.

The external power source lead terminal 13 is a connector, for example, removably connectable to an AC adapter 7. The AC adapter 7 is a power-source circuit charging the secondary battery 5 by converting a commercial AC power-source-voltage AC, for example at 100 V, into a DC voltage for secondary battery 5 and outputting it via the external power source lead terminal 13 to the secondary battery 5. For example when at home or in office where commercial AC power source is available, the user can plug an AC adapter 7 to the external power source lead terminal 13 and charge the secondary battery 5 through the AC adapter 7.

The primary battery 6 may be an alkaline battery such as alkaline manganese battery, nickel manganese battery, zinc oxide battery, or silver oxide battery, or a lithium battery such as manganese dioxide lithium battery or graphite fluoride lithium battery. The primary battery 6 is used as it is placed in a battery holder not shown in the Figure, for example that is removable from the electrical device 1; and for example by installing the battery holder storing the primary battery 6 not shown in the Figure in the electrical device 1, the positive electrode of primary battery 6 is connected, via a positive electrode terminal 11, to a short circuiting portion 2, a voltage detector 3, and a charging circuit 4, and the negative electrode of primary battery 6, via the negative electrode terminal 12, to ground.

The charging circuit 4, which is for example a DC-DC converter, receives the power outputted from the primary battery 6 through the positive electrode terminal 11 and the negative electrode terminal 12 and charges the secondary battery 5 after the voltage is converted to a voltage suitable for charging of the secondary battery 5. For operation of the charging circuit 4 to charge the secondary battery 5, the voltage between the positive electrode terminal 11 and the negative electrode terminal 12, i.e., the output voltage V1 of primary battery 6, should be in a certain voltage range.

The lower limit value of voltage needed for operation of the charging circuit 4 to charge the secondary battery 5 will be referred to as the lower-limit charging voltage Vlim. When the output voltage V1 of primary battery 6 is higher than the lower-limit charging voltage Vlim, the charging circuit 4 makes the current for charging the secondary battery 5 flows from the primary battery 6 to the charging circuit 4. On the other hand, when the output voltage V1 of primary battery 6 is not higher than the lower-limit charging voltage Vlim, the charging circuit 4 terminates charge operation of the secondary battery 5. The current flowing from the primary battery 6 to the charging circuit 4 then is only a leakage current of the charging circuit 4, and a small mount of current flows continuously from the primary battery 6 to the charging circuit 4. The lower-limit charging voltage Vlim is set for example to the discharge terminating voltage of primary battery 6. In such a case, the charging circuit 4 corresponds to an example of the load circuit.

The short circuiting portion 2 has a series circuit of a resistor R6 and a transistor Tr2 connected between the positive electrode terminal 11 and the negative electrode terminal 12, and when the transistor Tr2 is turned on, a short circuit route discharging the primary battery 6 via the resistor R6 is formed. A field effect transistor (FET) allowing bidirectional current may be used as the transistor Tr2. For example, a relay switch may be used, replacing the transistor Tr2.

The resistor R6 is a current-restricting resistor for prevention of the drastic rise in temperature of the primary battery 6 by discharge current, and thus, preferably has a resistance as small as possible while restricting discharge current to a degree that prohibits drastic temperature rise of the primary battery 6. When the primary battery 6 is a lithium battery, it is possible to prevent solubilization and precipitation of lithium effectively, by allowing a current of an hour-rate of 1 µC or more and 1 C or less with respect to the nominal capacitance of lithium battery. For example when the nominal capacitance of primary battery 6 is 3,000 mAh and the lower-limit charging voltage Vlim is 1.0 V, the resistance of the resistor R6 is set, for example, to a resistance operable to flow a current of an hour-rate of 1 µC or more and 1 C or less with respect to the nominal capacitance of the lithium battery at 1.0 V, for example a resistance of 100Ω or less. C represents the discharge current of the battery, and C=It.

Thus, when the transistor Tr2 is turned on, the positive electrode terminal 11 and the negative electrode terminal 12 are short-circuited via the resistor R6; the positive and negative electrodes of primary battery 6 connected respectively to the positive electrode terminal 11 and the negative electrode terminal 12 are kept at almost the same electric potential, as they are short-circuited via the resistor R6; and thus, it is possible to prevent polarity reversal of the positive electrode electric potential becoming smaller than the negative electrode electric potential.

The voltage detector 3 detects the output voltage V1 of primary battery 6 connected to the positive electrode terminal 11 and the negative electrode terminal 12, and outputs the detection signal to the short circuiting portion 2 to make the short circuiting portion 2 to perform the short-circuiting operation when the output voltage V1 is not higher than the lower-limit charging voltage Vlim (particular preset voltage). Specifically, the voltage detector 3 has, for example, resistors R1, R2, R3, R4, and R5, an operational amplifier OP1, and a transistor Tr1. The operational power supply voltage of the operational amplifier OP1 is supplied from the secondary battery 5. The output voltage of secondary battery 5 is divided by the resistors R1 and R2 to the reference voltage Vref. The resistance of the resistor R1 or R2 is previously set in such a manner that the reference voltage Vref becomes for example ½ of the lower-limit charging voltage Vlim.

The reference voltage Vref obtained by the resistors R1 and R2 is applied to the inversion input terminal of the operational amplifier OP1. The voltage between the positive electrode terminal 11 and negative electrode terminal 12, i.e., the output voltage V1 of primary battery 6, is divided by resistors R3 and R4, and the partial pressure voltage V2 is applied to the non-inversion input terminal of the operational amplifier OP1. The resistance of the resistor R3 or R4 is previously set at a resistance in such a manner that the partial pressure voltage V2 becomes, for example, ½ of the output voltage V1.

In such a case, even when the output voltage of secondary battery 5 or the output voltage V1 of primary battery 6 is higher than the voltage processable by the operational amplifier OP1, it is possible to lower the voltage to a voltage level allowing processing in the operational amplifier OP1, by divining the output voltage of secondary battery 5 with the resistors R1 and R2 and the output voltage V1 of primary battery 6 with the resistors R3 and R4.

It is not always needed to generate the reference voltage Vref by dividing the output voltage of secondary battery 5 with the resistors R1 and R2, and the reference voltage Vref may be generated by using a constant voltage circuit instead. If the output voltage V1 of primary battery 6 is in the voltage level allowing processing in the operational amplifier OP1, it is not necessary to divide the voltage with the resistors R3 and R4, and the output voltage V1 may be applied directly to the non-inversion input terminal of the operational amplifier OP1. In such a case, the lower-limit charging voltage Vlim may be generated by using a constant voltage circuit, and applied to the inversion input terminal of the operational amplifier OP1.

The emitter of the transistor Tr1 is connected to the positive electrode of secondary battery 5; the collector of transistor Tr1 is connected to the gate of transistor Tr2 and also via a resistor R5 to ground; and the base of the transistor Tr1 is connected to the output terminal of the operational amplifier OP1.

Figure 2:
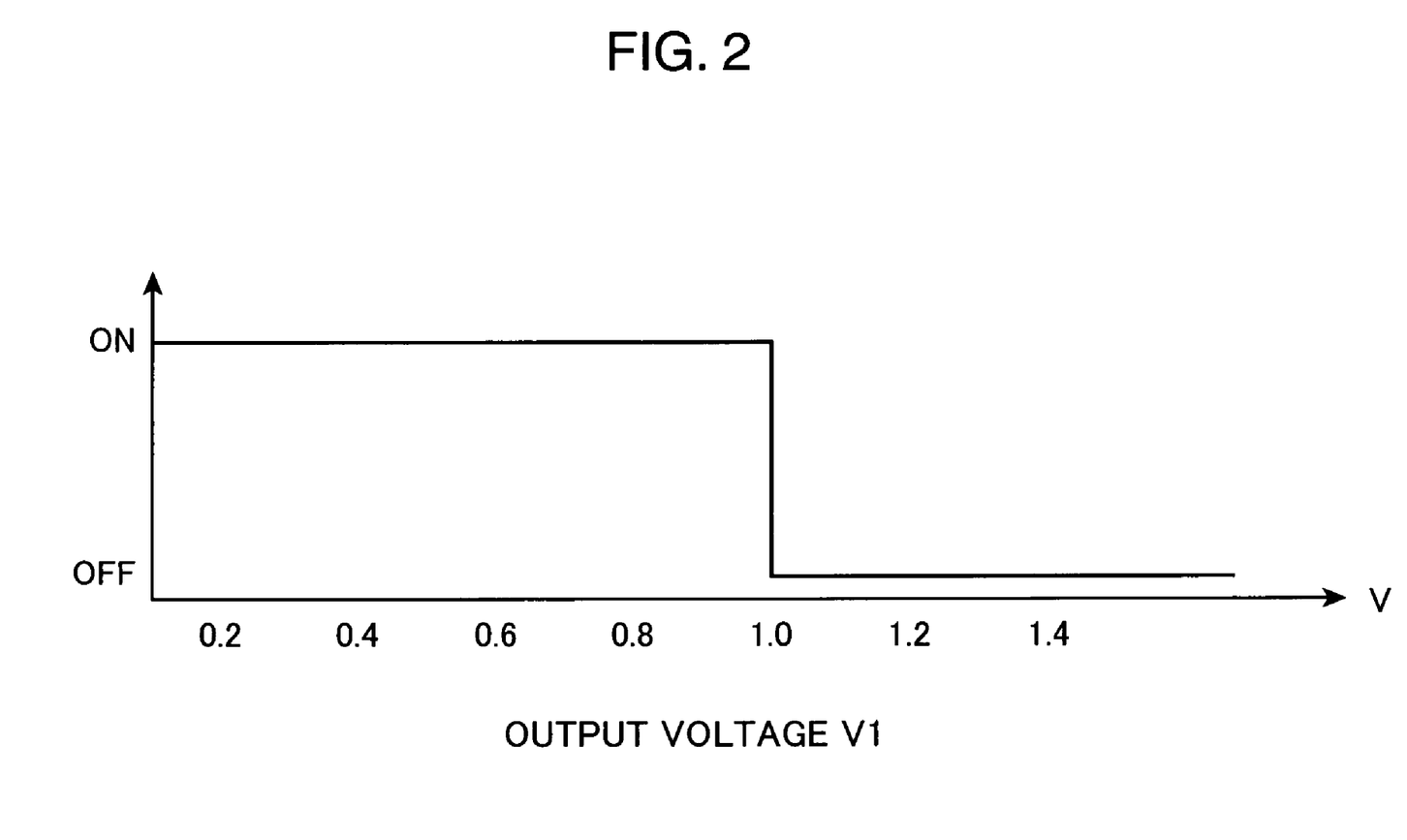
FIG. 2 is an explanatory chart showing a relationship between an output voltage of a primary battery shown in FIG. 1 and a transistor on/off operation.
Figure 3:
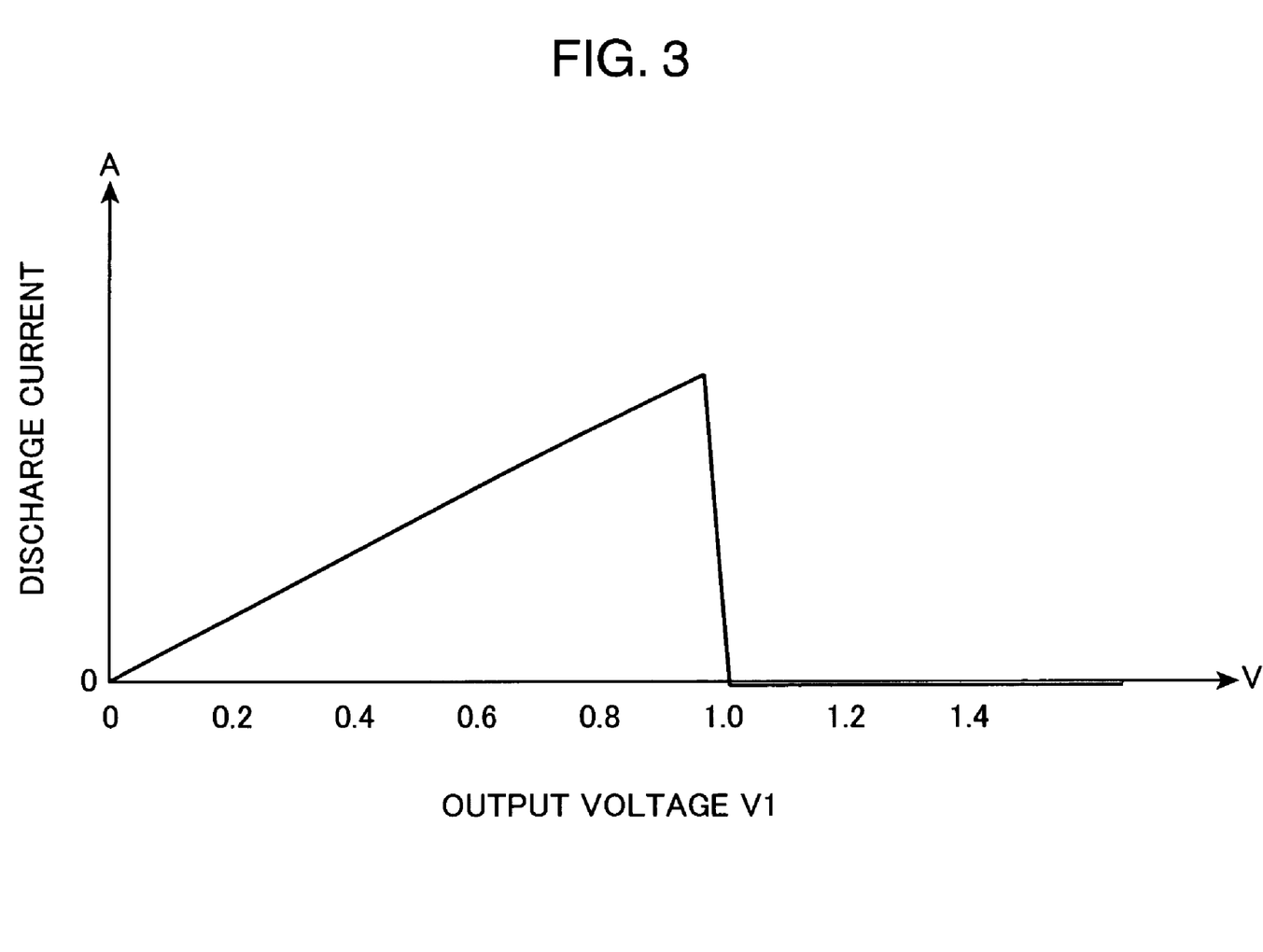
FIG. 3 is an explanatory chart showing a relationship between an output voltage of the primary battery and a discharge current of the primary battery shown in FIG. 1.

Hereinafter, operation of the electrical device 1 in the configuration above will be described. FIG. 2 is a chart showing the relationship between the output voltage V1 of primary battery 6 and the on/off operation of the transistor Tr2. FIG. 3 is a chart showing the relationship between the output voltage V1 of primary battery 6 and the discharge current of primary battery 6. When the user connects the primary battery 6 to the positive electrode terminal 11 and the negative electrode terminal 12 to charge the secondary battery 5 under an environment prohibiting use of commercial AC power source, for example, outdoor, the output voltage V1 of primary battery 6 is applied to the charging circuit 4, the voltage detector 3, and the short circuiting portion 2.

When the output voltage V1 of primary battery 6 is higher than the lower-limit charging voltage Vlim, for example 1.0 V, the partial pressure voltage V2 is also higher than the reference voltage Vref, and the output signal of operational amplifier OP1 is outputted to the base of transistor Tr1 at high level; the transistor Tr1 is then turned off, and the gate voltage of transistor Tr2 converted to low level by the resistor R5. When the output voltage V1 is higher than the lower-limit charging voltage Vlim, the transistor Tr2 is turned off, as shown in FIG. 2. As shown in FIG. 3, the primary battery 6 is not discharged, and the discharge current flowing in the short circuiting portion 2 disappears mostly. In this case, the output voltage V1 of primary battery 6 is higher than the lower-limit charging voltage Vlim, and thus, the secondary battery 5 is charged by the charging circuit 4, based on the output power of primary battery 6.

On the other hand, when the output voltage V1 of primary battery 6 becomes lower than the lower-limit charging voltage Vlim, for example 1.0 V, the partial pressure voltage V2 also becomes lower than the reference voltage Vref, and thus, the output signal of operational amplifier OP1 at low level is outputted to the base of transistor Tr1, turning on the transistor Tr1, and the gate voltage of transistor Tr2 is elevated into high level. As shown in FIG. 2, when the output voltage V1 is lower than the lower-limit charging voltage Vlim, the transistor Tr2 is turned on. Then, the primary battery 6 is discharged by the short circuiting portion 2 as shown in FIG. 3; the output voltage V1 decreases by discharging; and the discharge current of primary battery 6 decreases by the decrease in output voltage V1. When the output voltage V1 becomes 0 V, the discharge current flowing in the short circuiting portion 2 disappears.

Figure 4A:
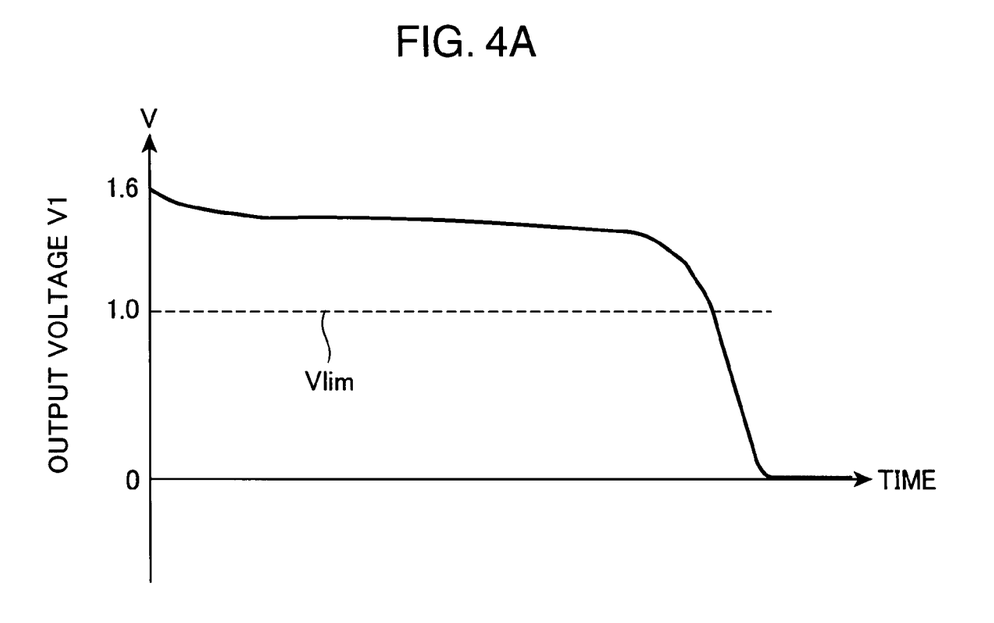
Figure 4B:
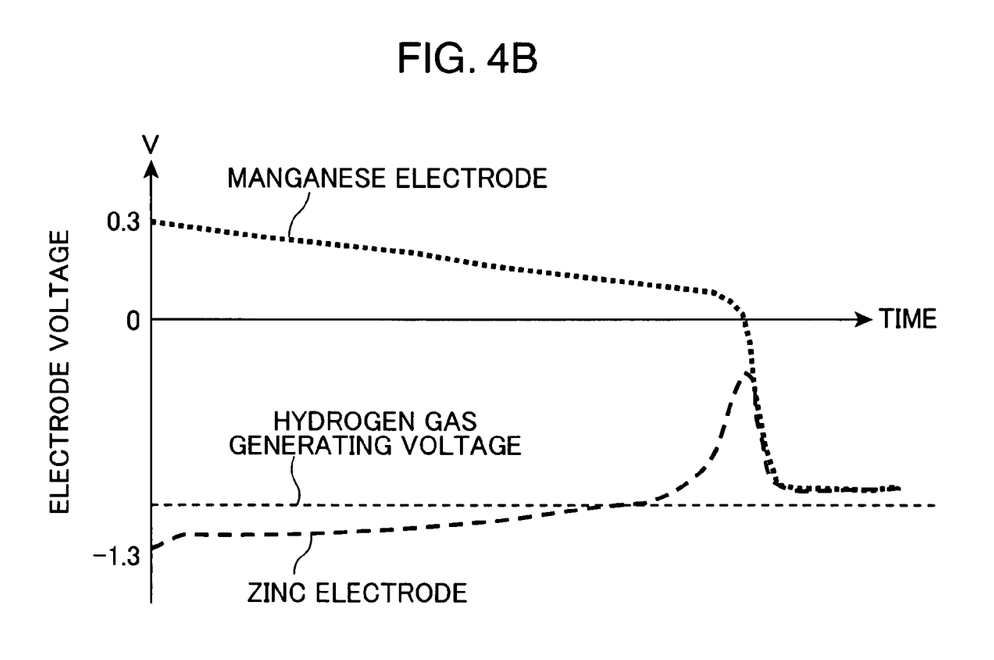
FIG. 4B is a graph showing change in the electric potential of a manganese electrode, the positive electrode and the electric potential of a zinc electrode, the negative electrode of the primary battery.

FIG. 4 is a graph showing change of the output voltage V1 and the electric potential of the electrode of the primary battery 6 (vs. HgO/Hg) when an alkaline battery is used as the primary battery 6. FIG. 4A is a graph showing the change in output voltage V1, while FIG. 4B is a graph showing the change in electric potential of a manganese electrode (positive electrode of primary battery 6) and a zinc electrode (negative electrode). In FIG. 4A, the charge-terminating voltage of primary battery 6 is for example 1.0 V, and the lower-limit charging voltage Vlim is set at 1.0 V, which is equal to the charge-terminating voltage of the primary battery 6.

The difference in potential between the manganese and zinc electrodes shown in FIG. 4B corresponds to the output voltage V1 of primary battery 6 shown in FIG. 4A. Along with power supply form the primary battery 6 to the charging circuit 4, the electric potential of the manganese electrode decreases gradually, and the electric potential of the zinc electrode increases gradually, while the output voltage V1 decreases gradually. When the output voltage V1 becomes lower than the lower-limit charging voltage Vlim, i.e., 1.0 V, the partial pressure voltage V2 also becomes not larger than the reference voltage Vref, and the output signal of operational amplifier OP1 at low level is outputted to the base of transistor Tr1, turning on the transistor Tr1, and the gate voltage of transistor Tr2 is elevated into high level.

Thus, the transistor Tr2 is turned on, and the primary battery 6 is discharged. The electric potential of the manganese electrode (positive electrode) decreases, and the electric potential of the zinc electrode (negative electrode) increases temporarily. When the output voltage V1 of the primary battery 6 becomes 0 V after further discharge, the transistor Tr2, which is a field effect transistor allowing bidirectional current, permits a current in the reverse direction when the output voltage V1 becomes negative, lower than 0 V, and thus, the output voltage V1 is kept 0 V. The impedance of the manganese or zinc electrode then increases gradually, and the output current of primary battery 6 decreases gradually.

Decrease of the output current of primary battery 6 leads to decrease of the electric potential of the zinc electrode, and the electric potential of the manganese electrode also changes together with the change of the electric potential of the zinc electrode, and the electric potentials of both electrodes are stabilized at an electric potential higher than the hydrogen gas generating electric potential. Because the discharge reaction on zinc electrode is a heterogeneous reaction in which zinc in the zinc electrode is oxidized to zinc oxide and there is always some unreacted zinc remaining in the zinc electrode, such change in electric potential is caused by recovery of the electric potential of the zinc electrode to the potential of the unreacted zinc, along with decrease of current. It is thus possible to control hydrogen gas generation and prevent leakage of the battery solution, by keeping the electric potential of the manganese and zinc electrodes respectively higher than the hydrogen gas generating electric potential.

Similarly when a lithium battery is used as the primary battery 6, if the output voltage V1 becomes not larger than the lower-limit charging voltage Vlim, turning on the transistor Tr2, the primary battery 6 is discharged further by the voltage detector 3; when the output voltage V1 becomes 0 V, the transistor Tr2 allows bidirectional current; the current flows in the reverse direction if the output voltage V1 becomes negative, less than 0 V; and thus, the output voltage V1 is kept 0 V. Reversal between the electric potential of the manganese electrode (positive electrode) and that of the lithium electrode (negative electrode) is prevented, and thus, solubilization of the lithium electrode is prevented, resulting in decrease of precipitation of lithium dendrite on the manganese and lithium electrodes. In this way, the precipitated lithium dendrite causes short circuiting between the lithium and manganese electrodes, which eliminates the concern about drastic temperature rise of the lithium battery.

If the reversal between the electric potential of the manganese electrode (positive electrode) and that of the lithium electrode (negative electrode) is prevented, solubilization and of iron (Fe) for example from the lithium battery case or the current collector and precipitation of the iron are prevented, and precipitated iron causes short-circuiting between the lithium and manganese electrodes, there is less concern about the drastic temperature rise of lithium battery.

The primary battery 6 preferably has a single cell or a plurality of cells connected to each other in parallel. When the primary battery 6 has, for example, a plurality of cells connected to each other in series, even if the output terminals of the primary battery 6 are short-circuited with the short circuiting portion 2, part of the cells connected in series may be in the state of polarity reversal.

Figure 5:
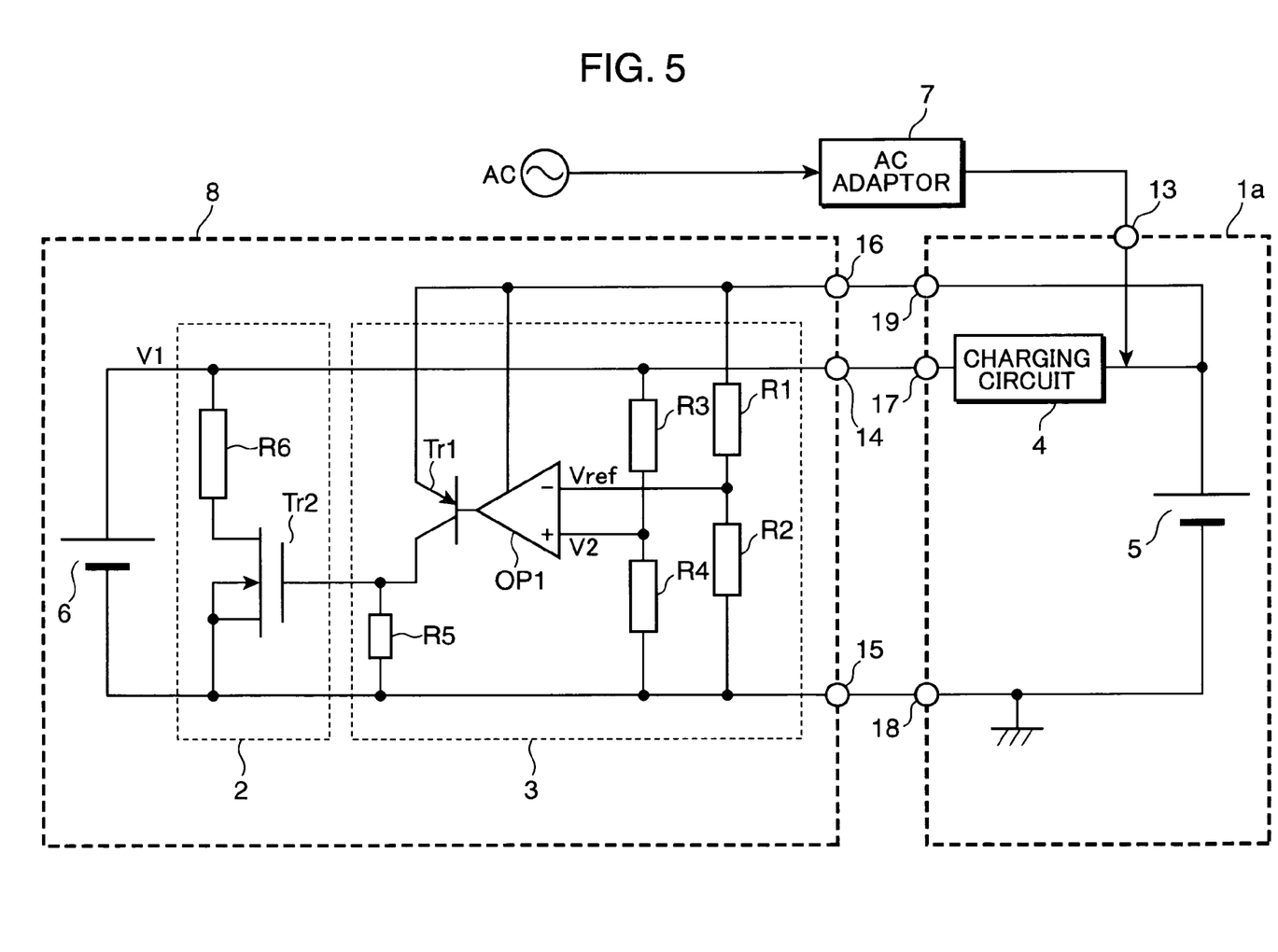
FIG. 5 is a block diagram showing a configuration of a battery pack in an embodiment of the present invention.

As shown in FIG. 5, the primary battery 6 shown in FIG. 1, a short circuiting portion 2, and a voltage detector 3 may be contained in a casing as a battery pack 8. The battery pack 8 shown in FIG. 5 has externally outputting terminals 14 and 15 for outputting the output power of primary battery 6 to an external device and a lead terminal 16 receiving the operational power for the voltage detector 3 from an electrical device 1a and supplies it to the voltage detector 3.

As in the electrical device 1a shown in FIG. 5, the electrical device using the battery pack 8 may be the electrical device 1 shown in FIG. 1 from which the short circuiting portion 2 and the voltage detector 3 are removed and to which lead terminals 17, 18, and 19 are installed. In such a case, the battery pack 8 is connectable to the electrical device 1a, and, when the battery pack 8 is installed in the electrical device 1a, the externally outputting terminals 14 and 15 are connected to lead terminals 17 and 18 respectively, and the lead terminal 16 to the lead terminal 19. When the battery pack 8 is installed in the electrical device 1a, the battery pack has a circuit having configuration similar to that in the electrical device 1 shown in FIG. 1, and thus, similarly to the electrical device 1 shown in FIG. 1, it is possible to reduce the concern about leakage and drastic temperature rise of the battery.

Although the electrical device 1 having a primary battery 6 as the auxiliary power source for charging the main power source was shown as an example, the battery pack may not have an auxiliary power source and thus, may not have a charging circuit 4. Specifically, the short circuiting portion 2 may be configured to make a short-circuit between the positive and negative electrodes of secondary battery 5 and the voltage detector 3 to turn on the transistor Tr2 when the output voltage of secondary battery 5 is lower than discharge terminating voltage. In this case, the secondary battery 5 corresponds to an example of the battery according to the invention.

In such a configuration without auxiliary power source, a primary battery may be used as the main power source, replacing the secondary battery 5. When the output voltage of a main power source of a battery such as secondary battery 5 or primary battery is lower than the discharge terminating voltage, the polarity reversal by short-circuiting of the battery of main power source via the resistor R6 caused by the short circuiting portion 2 is prevented, and thus, there is smaller concern about leakage and temperature rise of the battery.

The technology described above may be applied to any electrical devices using a battery and any battery packs for use in such electrical devices.

Thus, the electrical device of an aspect of the present invention comprises a positive electrode terminal for connection to the positive electrode of the battery, a negative electrode terminal for connection to the negative electrode of the battery, and a load circuit receiving power from the positive and negative electrode terminals connected to the battery, a voltage detector detecting the voltage between the positive and negative electrode terminals, and a short circuiting portion for making a short-circuit between the positive and negative electrode terminals when the voltage detected by the voltage detector becomes not larger than a particular preset voltage.

In the configuration, when a battery is connected to the positive and negative electrode terminals, power is supplied from the battery via the positive and negative electrode terminals to the load circuit. The voltage between the positive and negative electrode terminals, i.e., battery output voltage, is detected by the voltage detector. When the voltage detected by the voltage detector is not larger than a particular preset voltage, the positive and negative electrode terminals are short-circuited to each other by the short circuiting portion, and thus, the battery connected to the positive and negative electrode terminals is discharged; the positive and negative electrodes of the battery have the same electric potential; polarity reversal is prevented; and thus, there is less concern about the drastic temperature rise and leakage of the battery.

The electrical device may further has a energy storage element storing power, and the load circuit may have a charger for charging the energy storage element, based on the output power from a battery connected to the positive and negative electrode terminals. In the configuration, there is less concern about the drastic temperature rise and leakage of the battery used as auxiliary power source for charging the energy storage element for use as the main power source of the load circuit.

Preferably, the energy storage element above supplies the power supply voltage for operation of the voltage detector. In the configuration, the power supply voltage for operation of the voltage detector is supplied from the energy storage element, even when the positive and negative electrode terminals are short-circuited to each other by the short circuiting portion and there is no output power from the battery. Accordingly, even when the positive and negative electrode terminals are short-circuited to each other by the short circuiting portion, the power supply voltage for operation of the voltage detector is kept unchanged; the voltage between the positive and negative electrode terminals is consistently detected by the voltage detector; and short-circuiting operation of the positive and negative electrodes by the short circuiting portion is continued.

Preferably, the particular preset voltage is set at the discharge terminating voltage of the battery. In the configuration, after use of a battery to a discharge terminating voltage at which the battery output voltage is not suited for use as a battery any more, the battery connected to the positive and negative electrode terminals is discharged; the positive and negative electrodes of the battery have the same electric potential; polarity reversal is prevented; and thus, there is less concern about the drastic temperature rise and leakage of the battery.

The particular preset voltage may be set at the lower-limit charging voltage, the lower limit value of the output voltage allowing the charger to charge the energy storage element based on the output voltage of the battery.

In the configuration, after use of a battery to a discharge terminating voltage at which the battery output voltage is not suited for used as a battery any more, the positive and negative electrode terminals are short-circuited to each other by the short circuiting portion, and thus, the battery connected to the positive and negative electrode terminals is discharged; the positive and negative electrodes of the battery have the same electric potential; polarity reversal is prevented; and thus, there is less concern about the drastic temperature rise and leakage of the battery.

Preferably, the battery is an alkali primary battery. In the configuration, when the output voltage of the alkali primary battery is not higher than the particular preset voltage, the positive and negative electrode terminals are short-circuited to each other by the short circuiting portion, and thus, the alkali primary battery connected to the positive and negative electrode terminals is discharged; the positive and negative electrodes of the battery have the same electric potential; polarity reversal is prevented; and thus, there is less concern about the drastic temperature rise and leakage of the battery.

The battery may be a lithium battery. In the configuration, when the output voltage of the lithium battery is not higher than the particular preset voltage, the positive and negative electrode terminals are short-circuited to each other by the short circuiting portion, and thus, the lithium battery connected to the positive and negative electrode terminals is discharged; the positive and negative electrodes of the battery have the same voltage; polarity reversal is prevented; and thus, there is less concern about the drastic temperature rise and leakage of the battery, and consequently, there is less concern about the drastic temperature rise of the lithium battery by flow of short-circuit current by making a short-circuit between the lithium and manganese electrodes by the lithium dendrite.

Preferably when the voltage detected by the voltage detector is equal to the particular preset voltage, the short circuiting portion short-circuits the positive electrode terminal with the negative electrode terminal via a resistor operable to flow a current of an hour-rate of 1 μC or more and 1 C or less with respect to the nominal capacitance of the battery.

In the configuration, at least when the discharge of the battery is initiated as the positive and negative electrode terminals is short-circuited by the short circuiting portion, it is possible to allow a current of an hour-rate of 1 μC or more and 1 C or less with respect to the nominal capacitance of the battery while restricting the discharge current not to become excessive by a resistor; and especially when a lithium battery is connected to both the positive and negative electrode terminals, it is possible to reduce lithium deposition effectively. As a result, there is less concern about the lithium and manganese electrodes being short-circuited to each other by the lithium dendrite, allowing flow of short-circuit current and drastic temperature rise of the lithium battery.

Preferably, the battery has a single cell. When the battery has a plurality of cells connected to each other in series, there is a concern about polarity reversal in part of the cells connected to each other in series, even when the positive and negative electrode terminals are short-circuited to each other. However, in the configuration, the battery has only a single cell, and thus, polarity reversal is prevented more reliably by short-circuiting of the positive and negative electrode terminals.

The battery may have a plurality of cells connected to each other in parallel. When the battery has a plurality of cells connected to each other in series, there is a concern about polarity reversal in part of the cells connected to each other in series even when the positive and negative electrode terminals are short-circuited to each other. However, in the configuration, the battery has a plurality of cells connected to each other in parallel, and polarity reversal is prevented more reliably by short-circuiting of the positive and negative electrode terminals.

The battery pack of an aspect of the present invention has a battery, a voltage detector detecting the output voltage of the battery, a short circuiting portion for short-circuiting the battery when the voltage detected by the voltage detector is not larger than a particular preset voltage, and an externally outputting terminal for outputting the output power of the battery outward.

In the configuration, the battery output voltage outputting power outward via an externally outputting terminal is detected by the voltage detector. When the voltage detected by the voltage detector is not larger than a particular preset voltage, the battery is short circuited by the short circuiting portion; as a result, battery is discharged; the positive and negative electrodes of the battery have the same electric potential; polarity reversal is prevented; and thus, there is less concern about the drastic temperature rise and leakage of the battery.

This application is based on Japanese patent application No. 2006-206826, filed in Japan Patent Office on Jul. 28, 2006, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An electrical device, comprising:
   a positive electrode terminal for connection to a positive electrode of a battery;
   a negative electrode terminal for connection to a negative electrode of the battery;
   a load circuit for receiving power from the positive and negative electrode terminals connected to the battery;
   a voltage detector for detecting a voltage between the positive electrode terminal and the negative electrode terminal; and
   a short circuiting portion for making a short circuit via a resistor between the positive electrode terminal and the negative electrode terminal such that the short circuiting portion makes an electric potential of the positive electrode terminal and an electric potential of the negative electrode terminal equal when the voltage detected by the voltage detector becomes not larger than a particular preset voltage.

2. The electrical device according to claim 1, further comprising an energy storage element for storing power, wherein the load circuit has a charger for charging the energy storage element based on an output power from the battery connected to the positive and negative electrode terminals.

3. The electrical device according to claim 2, wherein the energy storage element supplies a power supply voltage for operation of the voltage detector.

4. The electrical device according to claim 1, wherein the particular preset voltage is set at a discharge terminating voltage of the battery.

5. The electrical device according to claim 2, wherein the particular preset voltage is set at a lower-limit charging voltage, the lower limit value of the output voltage allowing the charger to charge the energy storage element based on an output voltage of the battery.

6. The electrical device according to claim 1, wherein the battery is an alkali primary battery.

7. The electrical device according to claim 1, wherein the battery is a lithium battery.

8. The electrical device according to claim 1, wherein when the voltage detected by the voltage detector is equal to the particular preset voltage, the resistance of the resistor is set to be operable to flow a current of an hour-rate of 1 μC or more and 1 C or less with respect to a nominal capacitance of the battery.

9. The electrical device according to claim 1, wherein, the battery has a single cell.

10. The electrical device according to claim 1, wherein the battery has a plurality of cells connected to one another in parallel.

11. The electrical device according to claim 1, further comprising an energy storage element for storing power, wherein:
   the load circuit comprises a charger for charging an energy storage element based on an output power of a battery connected to the positive and negative electrode terminals;
   the energy storage element includes a lithium battery for supplying a power supply voltage for operation of the voltage detector; and,
   when the voltage detected by the voltage detector is equal to the particular preset voltage, the resistance of the resistor is set to be operable to flow a current of an hour-rate of 1 μC or more and 1 C or less with respect to the nominal capacitance of the battery.

12. A battery pack, comprising:
a battery;
a voltage detector for detecting an output voltage of the battery;
a short circuiting portion for short-circuiting the battery via a resistor such that the short circuiting portion makes an electric potential of the positive electrode of the battery and an electric potential of the negative electrode of the battery equal when the voltage detected by the voltage detector is not larger than a particular preset voltage; and
an externally outputting terminal for outputting an output power of the battery.

13. The battery pack according to claim 12, further comprising:
an energy storage element for storing power; and
a charger for charging the energy storage element based on an output power of the battery, wherein:
the energy storage element includes a lithium battery for supplying a power supply voltage for operation of the voltage detector; and
when the voltage detected by the voltage detector is equal to the particular preset voltage, the resistance of the resistor is set to be operable to flow a current of an hour-rate of 1 μC or more and 1 C or less with respect to the nominal capacitance of the battery.

* * * * *